(12) United States Patent
Jolley

(10) Patent No.: US 11,623,748 B2
(45) Date of Patent: Apr. 11, 2023

(54) GALLEY SLIDE OUT UTENSIL DRAWER AND MESSAGE CENTER

(71) Applicant: B/E Aerospace, Inc., Winston-Salem, NC (US)

(72) Inventor: Richard H. Jolley, Addington (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 156 days.

(21) Appl. No.: 16/801,428

(22) Filed: Feb. 26, 2020

(65) Prior Publication Data

US 2021/0261258 A1 Aug. 26, 2021

(51) Int. Cl.
*B64D 11/00* (2006.01)
*B64D 11/04* (2006.01)
*H02J 7/00* (2006.01)

(52) U.S. Cl.
CPC ...... *B64D 11/0015* (2013.01); *B64D 11/0007* (2013.01); *B64D 11/04* (2013.01); *H02J 7/0044* (2013.01)

(58) Field of Classification Search
CPC . B64D 11/0015; B64D 11/0007; B64D 11/00; B64D 11/04; A47B 77/14; A47B 88/42; A47B 88/988; G06F 1/1632; G06F 1/1607; G06F 1/1616; G06F 1/1618; G06F 1/1654; G06F 1/1679
See application file for complete search history.

(56) References Cited

U.S. PATENT DOCUMENTS

| | | | | |
|---|---|---|---|---|
| 4,756,528 A * | 7/1988 | Umashankar | ...... | B64D 11/0638 108/45 |
| 5,388,032 A * | 2/1995 | Gill | ...... | H05K 7/1494 361/679.01 |
| 6,254,955 B1 * | 7/2001 | Kuo | ...... | B42D 5/003 428/42.1 |
| 6,590,767 B2 * | 7/2003 | Liao | ...... | F16M 13/022 361/679.02 |

(Continued)

FOREIGN PATENT DOCUMENTS

| CN | 110584347 A | 12/2019 |
|---|---|---|
| DE | 19822694 A1 | 11/1999 |

(Continued)

OTHER PUBLICATIONS

Extended Search Report for European Application No. 21168326.3 dated Oct. 5, 2021, 9 pages.

*Primary Examiner* — Joshua J Michener
*Assistant Examiner* — Cindi M Curry
(74) *Attorney, Agent, or Firm* — Suiter Swantz pc llo

(57) ABSTRACT

A galley message center defines a tablet recess were a tablet is docked, substantially flush with the surrounding bulkhead so that a utensil storage drawer may be closely disposed to the message center and slide out in front of the tablet without the tablet needing to be removed. The docking element of the message center may be hinged to allow the tablet to be folded down with the screen against a recessed surface to protect the screen and prevent undesired or accidental interaction. The utensil storage drawer includes a plurality of features for securely holding utensils when not in use and place all of the stored utensils within reach of the flight staff, in proximity to a galley working surface.

6 Claims, 6 Drawing Sheets

(56) References Cited

U.S. PATENT DOCUMENTS

| | | | |
|---|---|---|---|
| 7,894,003 B2* | 2/2011 | Chang | B60R 11/0235 |
| | | | 348/837 |
| 2006/0154098 A1* | 7/2006 | Dollase | C09J 7/387 |
| | | | 428/522 |
| 2006/0175882 A1* | 8/2006 | Schweizer | B60N 3/004 |
| | | | 297/146 |
| 2007/0148409 A1* | 6/2007 | Rios | B32B 27/28 |
| | | | 428/167 |
| 2007/0199844 A1* | 8/2007 | Daley, III | A45C 5/02 |
| | | | 206/320 |
| 2009/0089841 A1* | 4/2009 | Hanlon | B60R 11/0235 |
| | | | 725/75 |
| 2010/0314978 A1* | 12/2010 | Manalang | B25H 3/06 |
| | | | 312/317.3 |
| 2011/0188197 A1 | 8/2011 | Jackson | |
| 2019/0210729 A1* | 7/2019 | Riedel | B64D 11/0015 |
| 2019/0308729 A1 | 10/2019 | Riedel et al. | |

FOREIGN PATENT DOCUMENTS

| | | |
|---|---|---|
| DE | 102017201103 A1 | 7/2018 |
| EP | 3552963 A1 | 10/2019 |
| KR | 20160001263 U | 4/2016 |

\* cited by examiner

GALLEY SLIDE OUT UTENSIL DRAWER AND MESSAGE CENTER

BACKGROUND

Aircraft, especially crew work areas of aircraft, are space constrained. All of the available space is generally highly utilized with little free space. Furthermore, the work areas are busy and utilitarian. There are no features for securely storing messages and messaging devices while still making them available for use. Likewise, there are no features for securely storing kitchen utensils while still making them readily available.

SUMMARY

In one aspect, embodiments of the inventive concepts disclosed herein are directed to a galley message center and secure utensil storage drawer. The message center defines a tablet recess were a tablet is docked, substantially flush with the surrounding bulkhead. Where the tablet is flush when docked, the utensil storage drawer may be closely disposed to the message center and slide out in front of the tablet without the tablet needing to be removed.

In a further aspect, the docking element of the message center may be hinged to allow the tablet to be folded down with the screen against a recessed surface to protect the screen and prevent undesired or accidental interaction.

The utensil storage drawer includes a plurality of features for securely holding utensils when not in use. The utensil storage draw places all of the stored utensils within reach of the flight staff, in proximity to a galley working surface.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
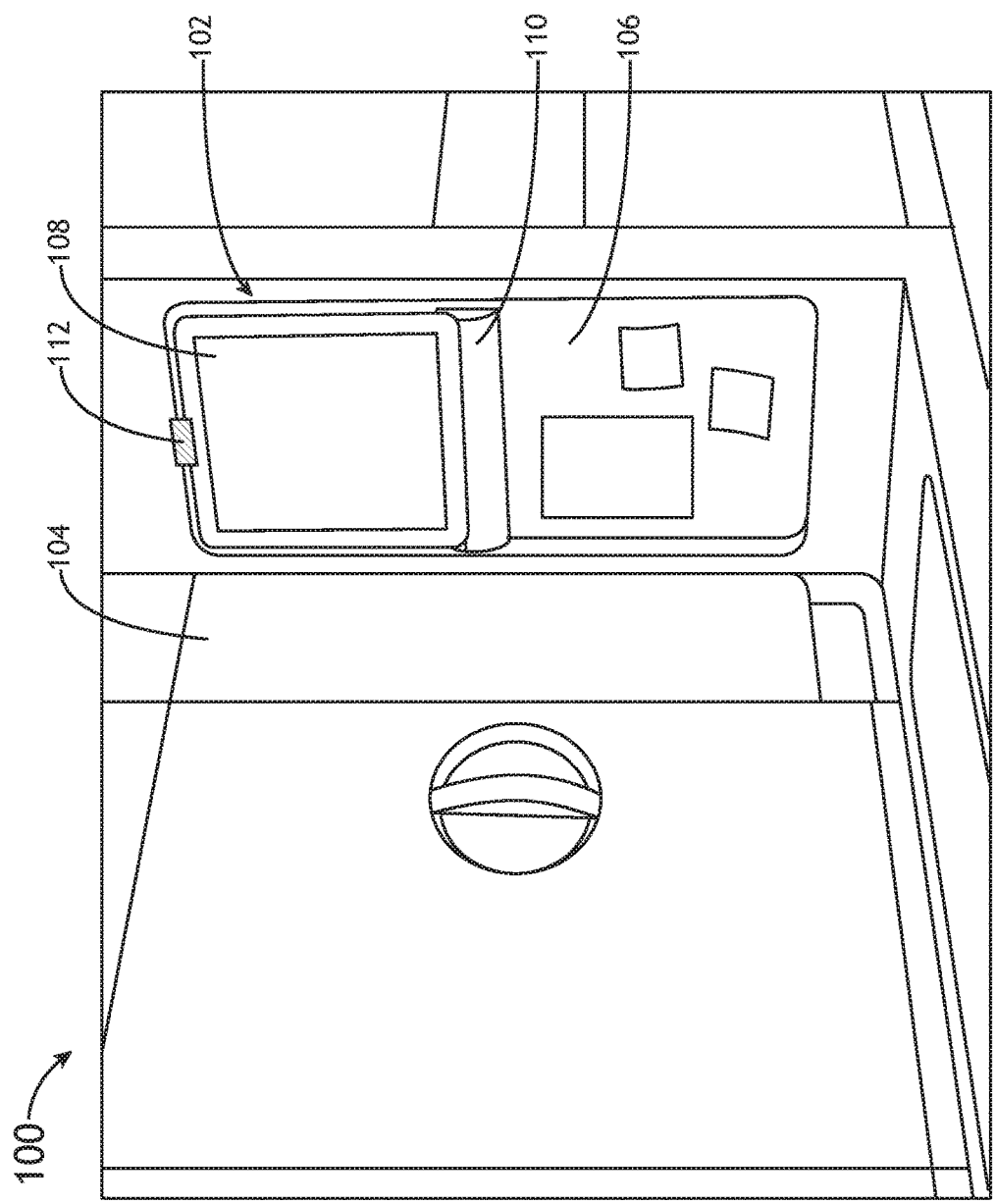
FIG. 1 shows an environmental view of an exemplary embodiment of a message center and secure utensil storage drawer.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a galley message center and secure utensil storage drawer. The message center defines a tablet recess were a tablet is docked, substantially flush with the surrounding bulkhead. Where the tablet is flush when docked, the utensil storage drawer may be closely disposed to the message center and slide out in front of the tablet without the tablet needing to be removed.

Referring to FIG. 1, an environmental view of an exemplary embodiment of a galley 100 having a message center 102 and secure utensil storage drawer 104 is shown. The message center 102 is disposed in a galley bulkhead, either as an integral component of the bulkhead or a self-contained element suitable for retrofitting in existing bulkheads. The message center 102 defines one or more recessed portions 106, at least one recessed portion 200 configured to allow a tablet 108 in a docking element 110 to sit substantially flush with the surrounding bulkhead surface. The tablet 108 may be held in the recessed portion 106 by a releasable latch 112.

Figure 2A:
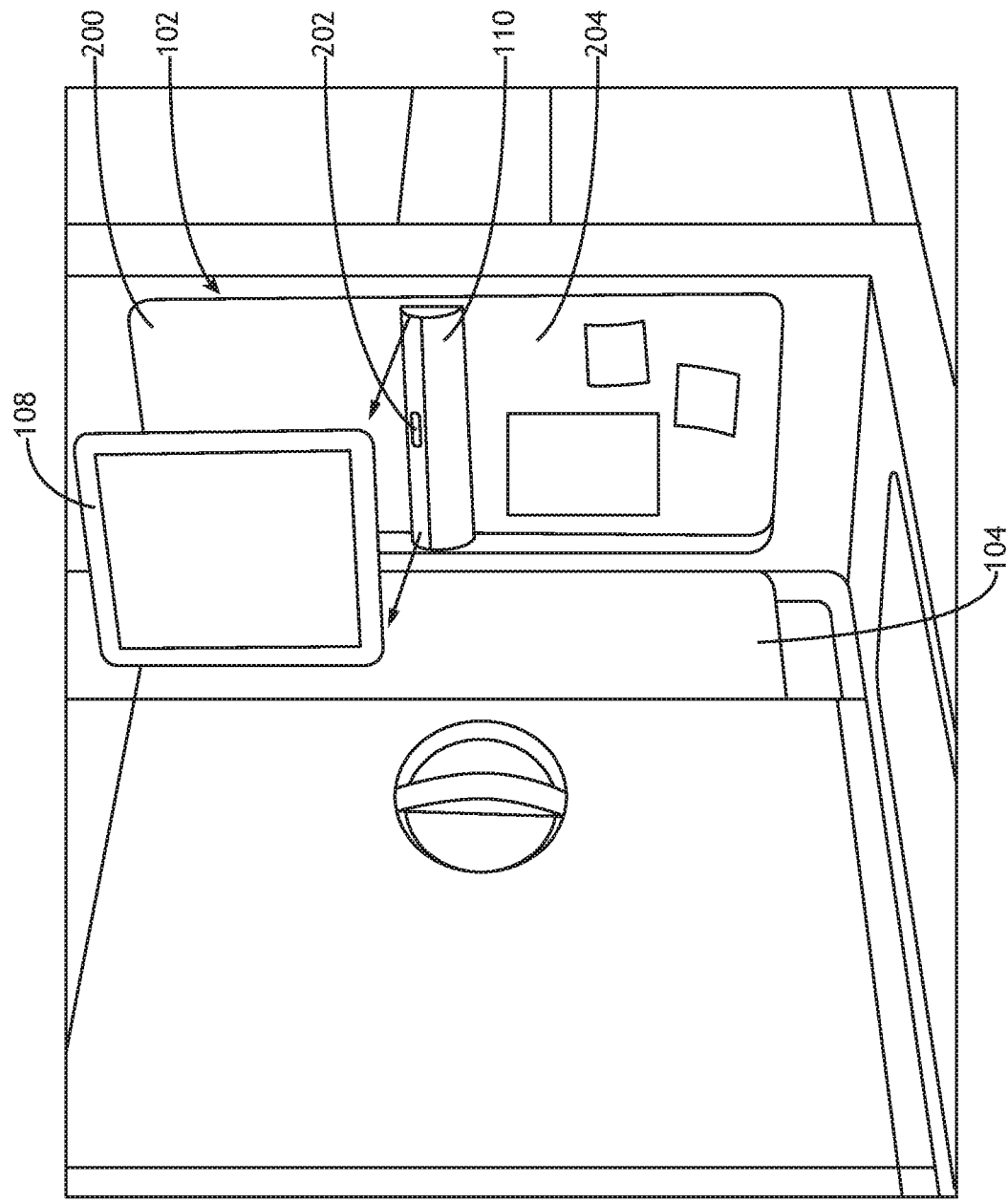
FIG. 2A shows an environmental view of an exemplary embodiment of a message center and secure utensil storage drawer.
Figure 2B:
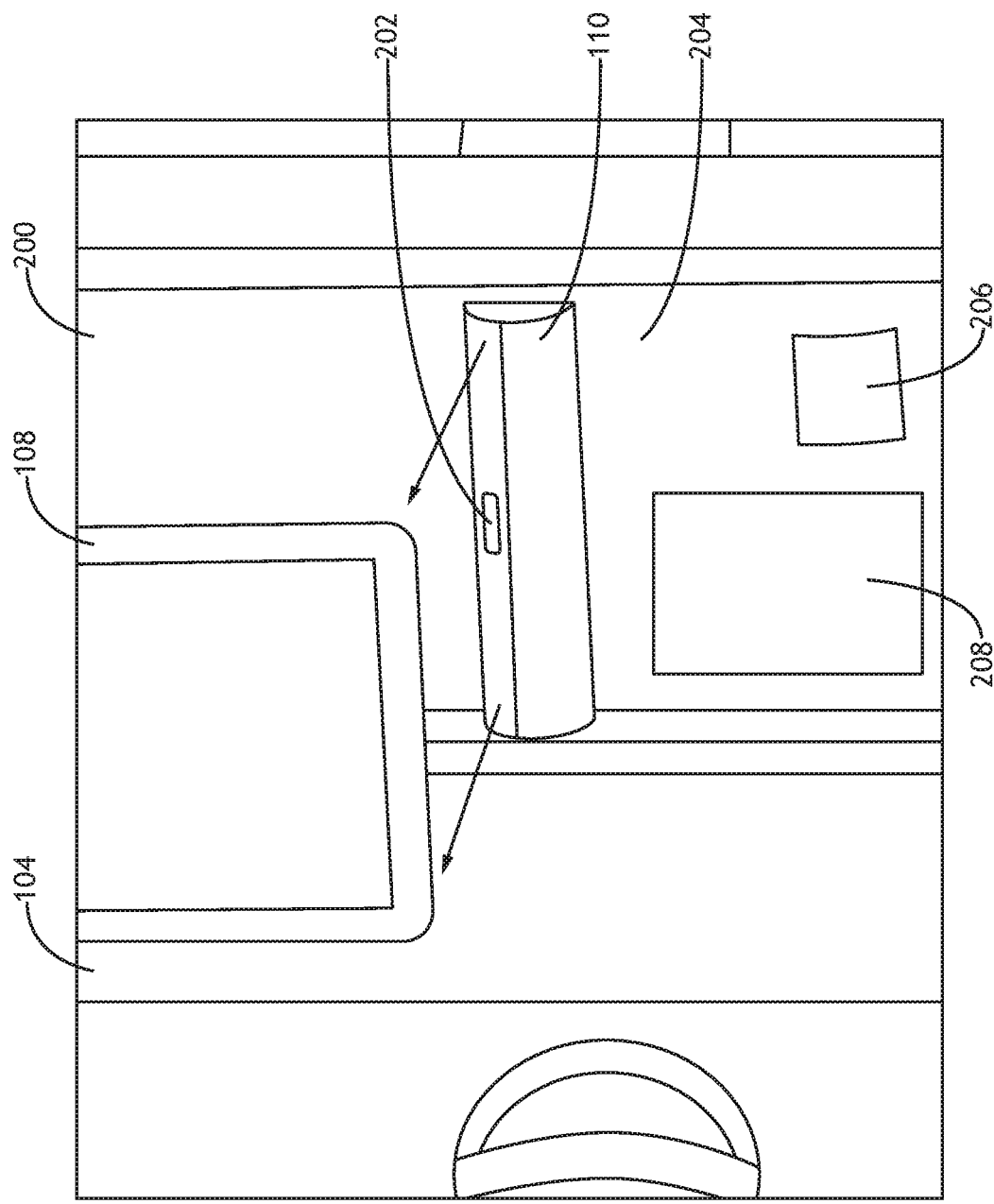
FIG. 2B shows a detail view of an exemplary embodiment of a message center of FIG. 2A.

Referring to FIG. 2A-2B, an environmental view and detail view of an exemplary embodiment of a message center 102 and secure utensil storage drawer 104 are shown. Where a tablet 108 is releasably held in an upper recessed portion 200, a docking element 110 may include a charging element 202 for charging the tablet 108 while docked. The docking element 110 may support adapters to the charging element 202 for different tablets 108. Furthermore, the charging element 110 may be hinged within a range to allow the tablet 108 to rotate when a latch is release to facilitate removal of the tablet 108 from the docking element 110.

In at least one embodiment, a lower recessed portion 204 is adapted for reusable adhesive notes 206, 208. For example, the lower recessed portion 204 may include a polished surface to facilitate adhesion of the relatively weak reusable adhesive. Alternatively, the lower recessed portion 204 may include a slightly adhesive silicone layer to enhance adhesion.

Figure 3:
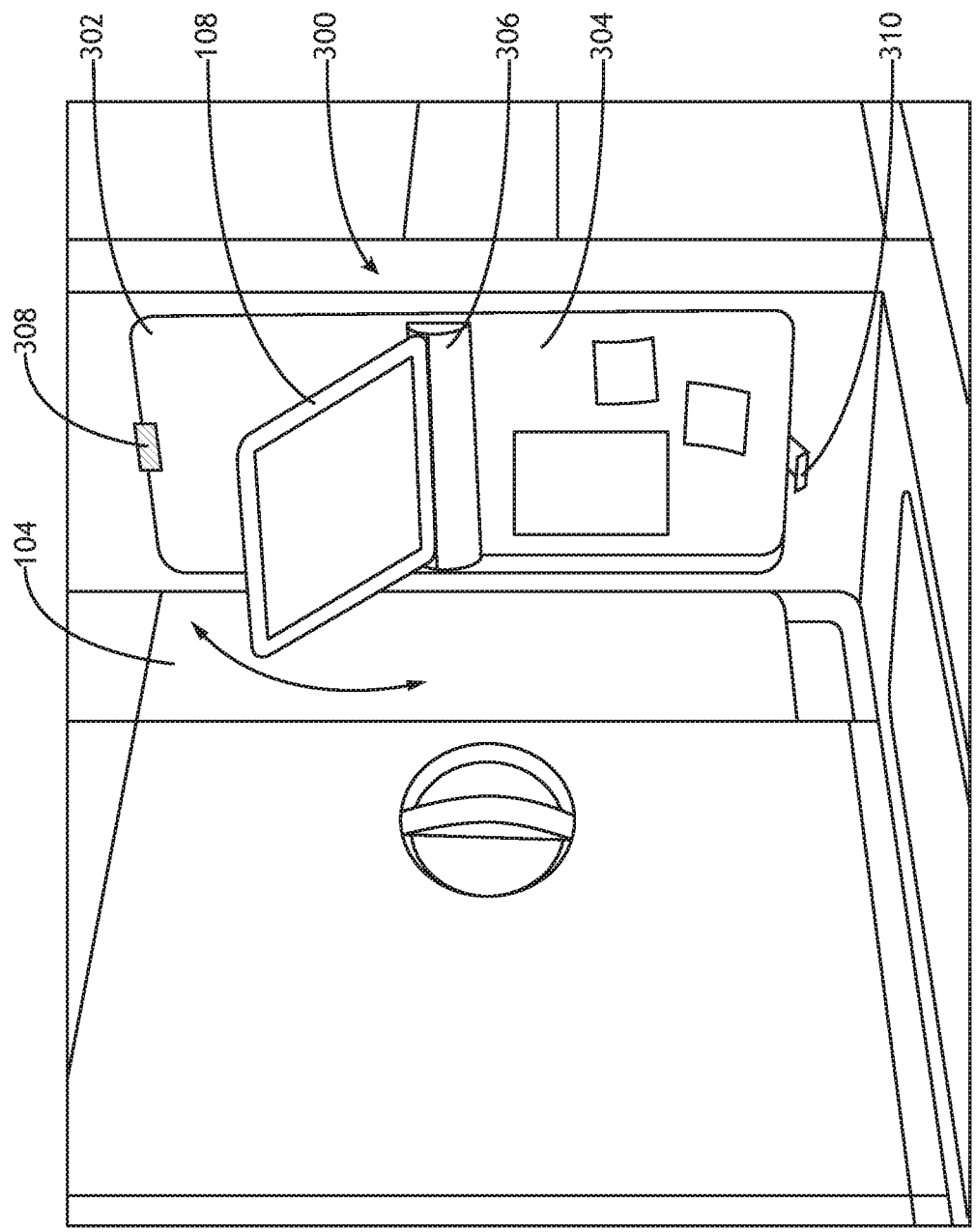
FIG. 3 shows an environmental view of an exemplary embodiment of a message center and secure utensil storage drawer.

Referring to FIG. 3, an environmental view of an exemplary embodiment of a message center 300 and secure utensil storage drawer 104 is shown. Where a tablet 108 is releasably held in an upper recessed portion 302, a docking element 306 may be hinged to allow the tablet 108 to rotate when an upper latch 308 is release to rotate from an upper recessed portion 302 to a lower recessed portion 304 without being removed from the docking element 306. After rotation, the screen of the tablet 108 abuts a surface of the lower recessed portion 304 to protect the screen and prevent accidental or undesirable contact. A lower latch 310 may maintain the tablet 108 in the lower recessed portion 304 and work to bias the tablet toward the surface of the lower recessed portion 304 so that the tablet 108 remains substantially flush with the surface of the bulkhead so as to not incumber the secure utensil storage drawer 104

In at least one embodiment, a lower recessed portion 304 is adapted for reusable adhesive notes. For example, the lower recessed portion 304 may include a polished surface to facilitate adhesion of the relatively weak reusable adhesive. Alternatively, the lower recessed portion 304 may include a slightly adhesive silicone layer to enhance adhesion. In at least one embodiment, a slightly adhesive silicone layer may prevent scratches to the screen of the tablet 108 when secured within the lower recessed portion 304.

Figure 4:
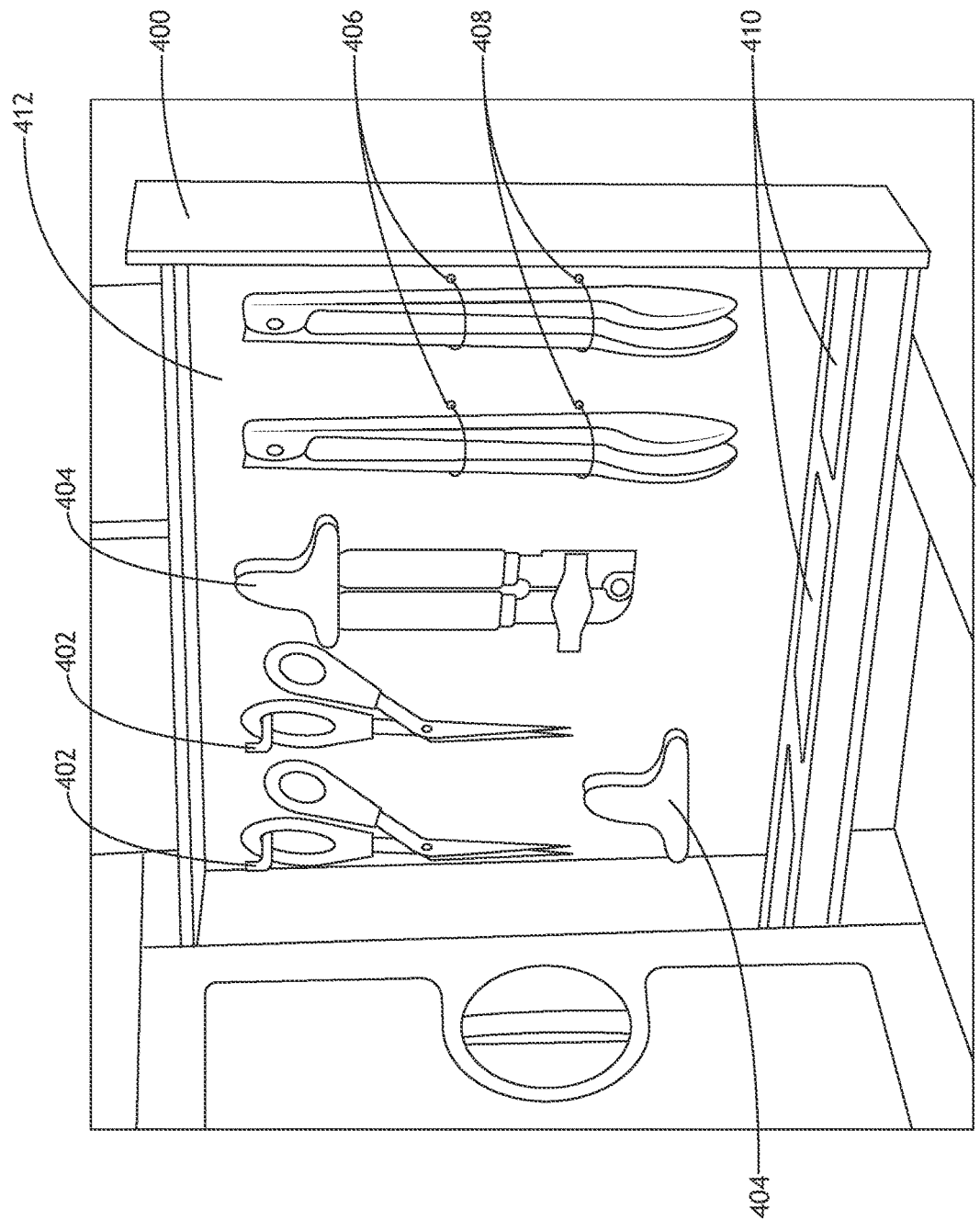
FIG. 4 shows an environmental view of an exemplary embodiment of a secure utensil storage drawer.

Referring to FIG. 4, an environmental view of an exemplary embodiment of a secure utensil storage drawer 400 is shown. The secure utensil storage drawer 400 is vertically oriented and disposed so as to obscure a tablet-based galley message center (obscured) when fully extended. The secure utensil storage drawer 400 includes a plurality of securing features 402, 404, 406, 408 for securing various types of utensils. For example, for utensils having a closed finger loop, a hook 402 is affixed to extend from a vertical surface 412 of the secure utensil storage drawer 400. In at least one embodiment, the hook 402 comprises a T-shaped element such that the utensil must be inserted horizontally and rotated to hang vertically.

In at least one embodiment, the secure utensil storage drawer 400 includes one or more clips 404 for holding utensils with a solid handle or other flat surface to grab. The clips 404 may be spring biased to hold such utensils. In at least one embodiment, the clips 404 are secured at fixed locations within the secure utensil storage drawer 400. In other embodiments, the clips 404 may be magnetized and the secure utensil storage drawer 400 includes a vertical surface 412 of a ferrous metal.

In at least one embodiment, the vertical surface 412 of the secure utensil storage drawer 400 includes one or more elastic bands 406, 408 for holding utensils such as tongs.

In at least one embodiment, the secure utensil storage drawer 400 includes one or more bins 410, defined either by a self-contained insert or a lower surface of the secure utensil storage drawer 400.

Figure 5:
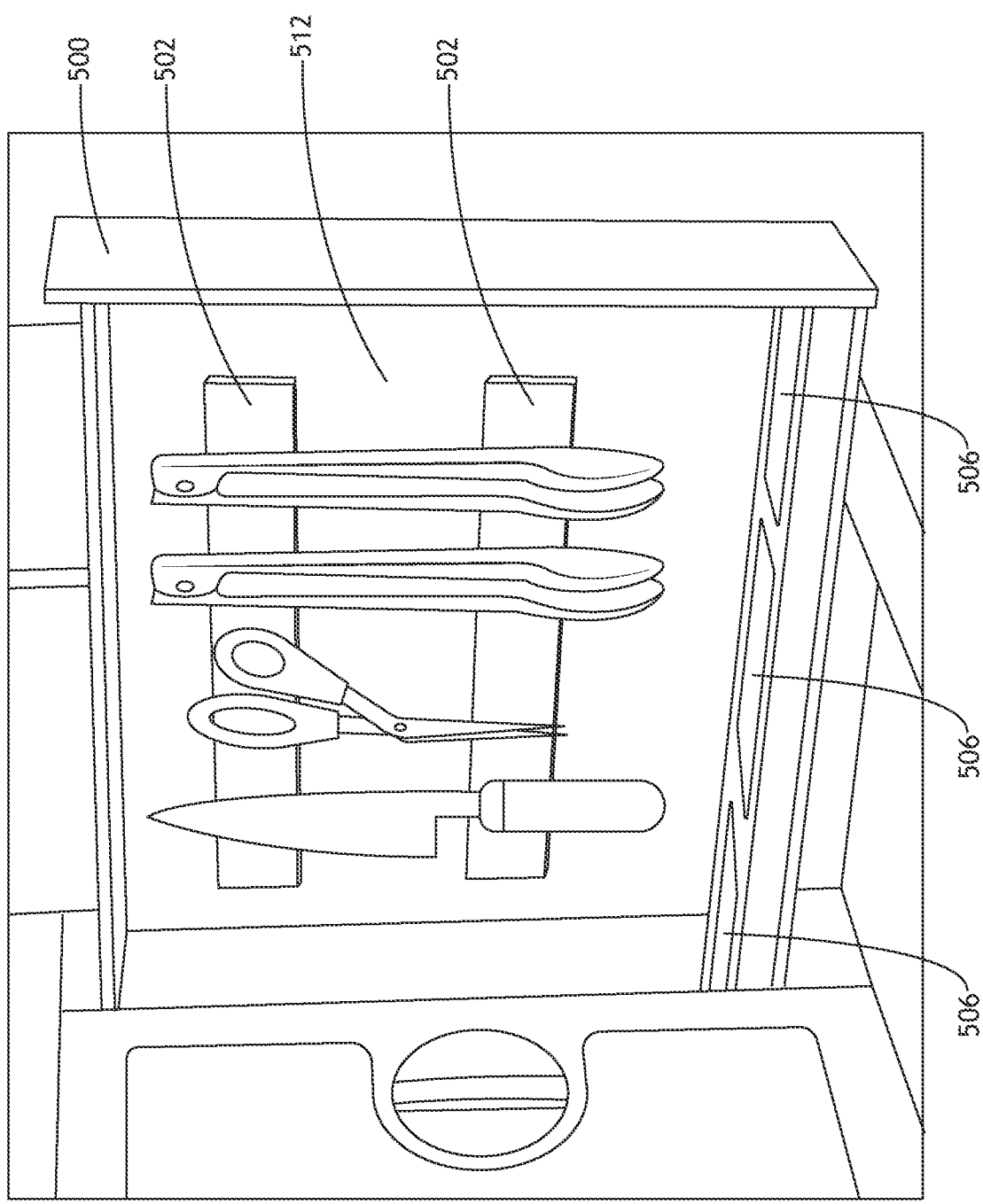
FIG. 5 shows an environmental view of an exemplary embodiment of a secure utensil storage drawer.

Referring to FIG. 5, an environmental view of an exemplary embodiment of a secure utensil storage drawer 500 is shown. The secure utensil storage drawer 500 includes one or more magnetic elements 502 disposed on a vertical surface 512 for securing metal utensils. In at least one embodiment, an embodiment including a vertical surface 512 with magnetic elements 502 and a vertical surface with other securing features (as shown in FIG. 4), where the vertical surface 512 with magnetic elements 502 comprises a sliding surface disposed in front of the vertical surface 512 with other securing features such that the magnetically retained utensils may be slid back and forth.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft galley message center comprising:
    a recessed portion defined by an aircraft bulkhead;
    a docking element configured to releasably hold a tablet within the recessed portion and rotate the tablet from an upper recessed portion of the recessed portion to a lower recessed portion of the recessed portion, flush with a surface of the aircraft bulkhead when disposed in either the upper recessed portion or the lower recessed portion;
    an adhesive silicone layer disposed on the tablet facing surface of the lower recessed portion configured to enhance adhesion of reusable adhesive notes;
    a charging element disposed within the docking element;
    an upper latch configured to engage a superior surface of the tablet and retain the tablet in the upper recessed portion with a screen facing out; and
    a lower latch configured to engage the superior surface of the tablet and retain the tablet in the lower recessed portion.

2. The galley message center of claim 1, wherein the recessed portion comprises an upper recessed portion configured to receive the tablet and a lower recessed portion adapted to receive self-adhesive notes.

3. An aircraft galley comprising:
    a message center comprising:
        a recessed portion defined by an aircraft bulkhead;
        a rotatable docking element configured to releasably hold a tablet within the recessed portion and rotate the tablet from an upper recessed portion of the recessed portion to a lower recessed portion of the recessed portion, flush with a surface of the aircraft bulkhead when disposed in either the upper recessed portion or the lower recessed portion;

an adhesive silicone layer disposed on the tablet facing surface of the lower recessed portion configured to enhance adhesion of reusable adhesive notes;

an upper latch configured to engage a superior surface of the tablet and retain the tablet in the upper recessed portion with a screen facing out;

a lower latch configured to engage the superior surface of the tablet and retain the tablet in the lower recessed portion; and a charging element disposed within the docking element; and a secure utensil drawer comprising:

a vertical slideout disposed in an aircraft galley bulkhead;

a plurality of utensil retaining features disposed on a vertical surface of the vertical slideout; and one or more bin disposed on a lower horizontal surface, wherein:

the plurality of utensil retaining features comprises at least one closed finger loop hook, at least one clip, and at least one elastic band.

4. The aircraft galley of claim 3, wherein the secure utensil drawer further comprises one or more magnetic elements disposed on the vertical surface.

5. The aircraft galley of claim 3, wherein the vertical surface comprises a first vertical surface, and wherein the secure utensil drawer further comprises a second vertical surface comprising one or more magnetic element, the second vertical surface being disposed in front of the first vertical surface, and being laterally displaceable.

6. The aircraft galley of claim 3, wherein the at least one hook comprises a T-shaped element.

* * * * *